United States Patent
Mimberg

(10) Patent No.: US 8,248,806 B1
(45) Date of Patent: Aug. 21, 2012

(54) SYSTEM AND METHOD FOR DIRECTLY COUPLING A CHASSIS AND A HEAT SINK ASSOCIATED WITH A CIRCUIT BOARD OR PROCESSOR

(75) Inventor: Ludger Mimberg, Baesweiler (DE)

(73) Assignee: NVIDIA Corporation, Santa Clara, CA (US)

( * ) Notice: Subject to any disclaimer, the term of this patent is extended or adjusted under 35 U.S.C. 154(b) by 135 days.

(21) Appl. No.: 12/325,921

(22) Filed: Dec. 1, 2008

(51) Int. Cl.
- *H05K 5/00* (2006.01)
- *H05K 7/20* (2006.01)
- *F28F 7/00* (2006.01)
- *H01L 23/495* (2006.01)

(52) U.S. Cl. .......... 361/720; 361/679.54; 361/719; 361/711; 361/704; 361/709; 165/80.2; 257/675

(58) Field of Classification Search .......... 361/720, 361/679.54, 704, 709, 711, 719; 165/80.2; 257/675
See application file for complete search history.

(56) References Cited

U.S. PATENT DOCUMENTS

| | | | | |
|---|---|---|---|---|
| 5,544,006 A * | 8/1996 | Radloff et al. | ......... | 361/679.32 |
| 5,706,173 A * | 1/1998 | Carney et al. | ......... | 361/740 |
| 5,822,193 A * | 10/1998 | Summers et al. | ......... | 361/759 |
| 5,847,923 A * | 12/1998 | Lee | ......... | 361/679.4 |
| 5,982,627 A * | 11/1999 | Haughton et al. | ......... | 361/759 |
| 6,222,725 B1 * | 4/2001 | Jo | ......... | 361/679.23 |
| 6,320,760 B1 * | 11/2001 | Flamm et al. | ......... | 361/801 |
| 6,717,811 B2 * | 4/2004 | Lo et al. | ......... | 361/698 |
| 6,937,474 B2 * | 8/2005 | Lee | ......... | 361/715 |
| 7,002,797 B1 * | 2/2006 | Wittig | ......... | 361/695 |
| 7,319,588 B2 * | 1/2008 | Peng et al. | ......... | 361/700 |
| 7,369,412 B2 * | 5/2008 | Peng et al. | ......... | 361/715 |
| 7,382,621 B2 * | 6/2008 | Peng et al. | ......... | 361/719 |
| 7,447,023 B2 * | 11/2008 | Chen et al. | ......... | 361/695 |
| 7,492,596 B1 * | 2/2009 | Peng et al. | ......... | 361/700 |
| 7,787,247 B2 * | 8/2010 | Han | ......... | 361/679.47 |
| 2003/0169567 A1 * | 9/2003 | Tantoush et al. | ......... | 361/695 |
| 2006/0012959 A1 * | 1/2006 | Lee et al. | ......... | 361/700 |
| 2007/0047200 A1 * | 3/2007 | Huang | ......... | 361/695 |
| 2007/0139894 A1 * | 6/2007 | Chang et al. | ......... | 361/715 |
| 2008/0137292 A1 * | 6/2008 | Chen et al. | ......... | 361/695 |
| 2009/0059524 A1 * | 3/2009 | Peng et al. | ......... | 361/697 |
| 2009/0080162 A1 * | 3/2009 | Lin et al. | ......... | 361/720 |

* cited by examiner

*Primary Examiner* — Bradley Thomas
(74) *Attorney, Agent, or Firm* — Zilka-Kotab, PC

(57) ABSTRACT

A system and method are provided for directly coupling a chassis and a heat sink. A circuit board is provided with at least one processor mounted thereon. Additionally, a heat sink is provided, the heat sink being mechanically coupled to at least one of the circuit board and the processor for providing thermal communication between the heat sink and the circuit board. Furthermore, a mount is provided, the mount being coupled to the heat sink for providing a direct mechanical coupling with a chassis.

21 Claims, 6 Drawing Sheets

SYSTEM AND METHOD FOR DIRECTLY COUPLING A CHASSIS AND A HEAT SINK ASSOCIATED WITH A CIRCUIT BOARD OR PROCESSOR

FIELD OF THE INVENTION

The present invention relates to computer architectures, and more particularly to reducing stress on circuit boards associated with packages of such architectures.

BACKGROUND

Graphics cards are often subjected to various forces during shipment. In order to avoid damage to components on the graphics cards, edge stiffeners are often added to the cards to prevent bending and/or deflection to such cards. These stiffeners transfer forces from shocks and vibrations directly to the circuit boards of the graphics cards. This creates the possibility of damage to the circuit board and electrical connections of the circuit board. There is thus a need for addressing these and/or other issues associated with the prior art.

SUMMARY

A system and method are provided for directly coupling a chassis and a heat sink. A circuit board is provided with at least one processor mounted thereon. Additionally, a heat sink is provided, the heat sink being mechanically coupled to at least one of the circuit board and the processor for providing thermal communication between the heat sink and the circuit board. Furthermore, a mount is provided, the mount being coupled to the heat sink for providing a direct mechanical coupling with a chassis.

DETAILED DESCRIPTION

Figure 1:
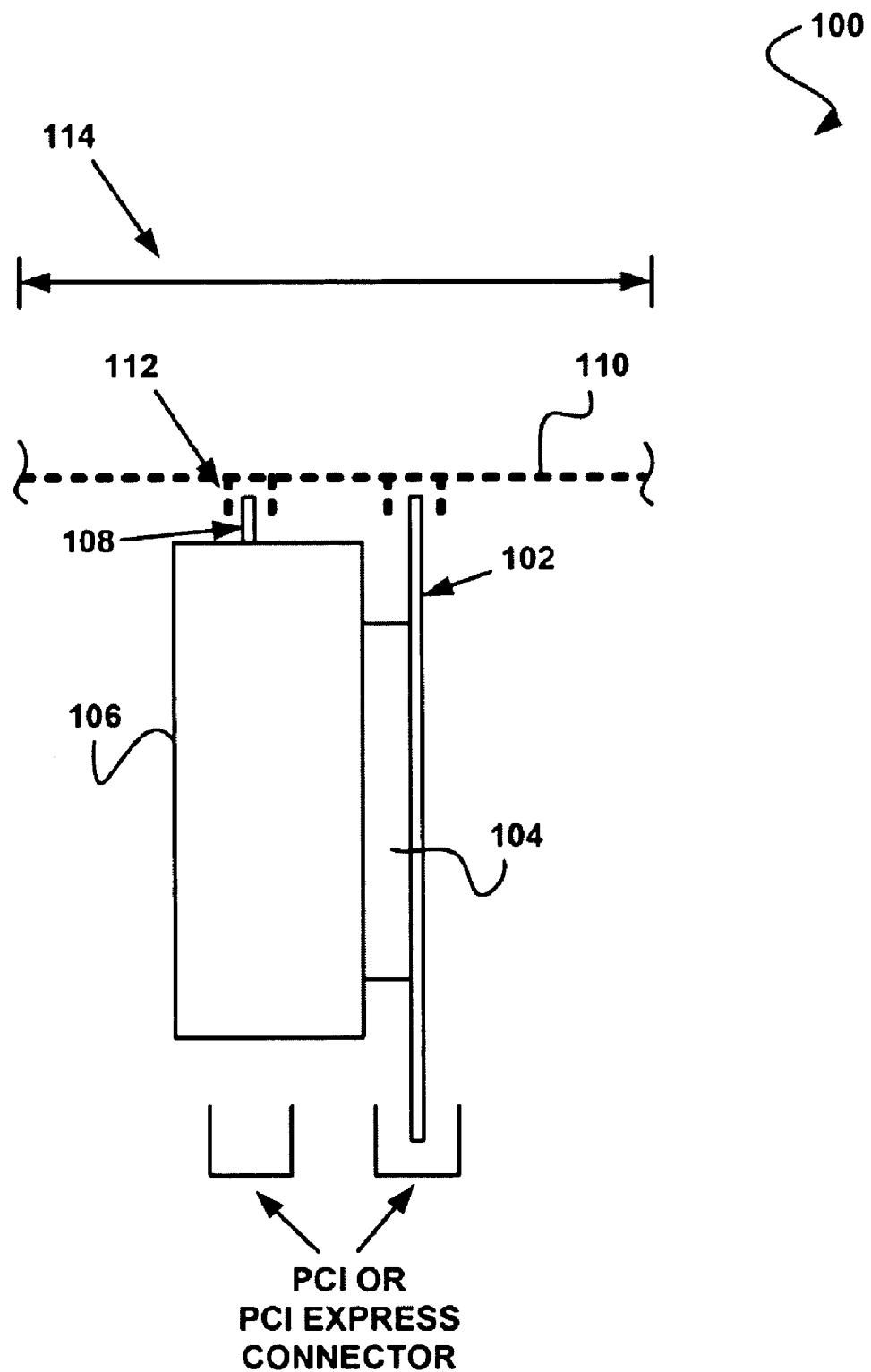
FIG. 1 shows an apparatus for directly coupling a chassis and a heat sink, in accordance with one embodiment.

FIG. 1 shows an apparatus 100 for directly coupling a chassis and a heat sink, in accordance with one embodiment. As shown, a circuit board 102 is provided with at least one package 104 mounted thereon. The package may include any component. For example, in various embodiments, the package may include an FPGA, networking custom application-specific integrated circuits (ASICs), and/or any component residing in a package and/or having a fine structure.

In one embodiment, the package may be or include a processor. The processor may include any type of processor. For example, in various embodiments, the processor may include a central processing unit, a graphics processor, a micro-processor, and/or any other type of processor.

Additionally, a heat sink 106 is provided. In the context of the present description, a heat sink refers to any mechanical structure, of any material, capable of absorbing and dissipating heat from another object using thermal contact.

The heat sink 106 is mechanically coupled to at least one of the circuit board 102 and the package 104 (e.g. a processor, etc.) for providing thermal communication (i.e. thermal conductivity) between the heat sink 106 and the package 104. Further, a mount 108 is provided. In this case, the mount 108 is coupled to the heat sink 106 for providing a direct mechanical coupling with a chassis 110.

In the context of the present description, a chassis refers to any case, enclosure, or housing, etc., capable of being used to house the circuit board 102 and components mounted thereon. For example, in various embodiments, the chassis 110 may include a cabinet, a tower, a box, a desktop case, a laptop case, a handheld computer case, and/or any other type of chassis.

The mount 108 may be coupled to the heat sink 106 in a variety of ways. For example, in one embodiment, the mount may be screwably coupled to the heat sink 106. In this case, screwably coupling the mount 108 to the heat sink 106 may include any technique of screwing, bolting, or similarly coupling the mount 108 to the heat sink 106.

In one embodiment, the mount 108 may include a pin or rod that may screw into the heat sink 106. As an option, the mount 108 may be substantially cylindrical. In this case, the mount 108 may be cylindrical or another shape that is similar to a cylindrical shape.

As option, the mount 108 may be substantially rectilinear. In this case, the mount 108 may be rectilinear or another shape that is similar to a rectilinear shape. As another option, the mount 108 may be the shape of another polygon.

In another embodiment, the mount 108 may be integrally coupled to the heat sink 106. In this case, integrally coupling the mount 108 to the heat sink 106 may include soldering, welding, molding, casting, or similarly coupling the mount 108 to the heat sink 106. As an option, this may be accomplished during a fabrication of the heat sink 106.

In either case, when providing the direct mechanical coupling, the mount 108 may preclude movement along at least one dimension. For example, the direct mechanical coupling of the mount 108 may preclude movement along an axis 114. In another case, the mount 108 may preclude movement along an axis perpendicular to the axis 114.

In one embodiment, when providing the direct mechanical coupling, the mount 108 may preclude movement along at least two dimensions. For example, the mount 108 may preclude movement along the axis 114 and an axis perpendicular to the axis 114. In these cases, the mount 108 may be configured for providing the direct mechanical coupling with at least one circuit board connector 112 of the chassis 110 and/or another connector of the chassis 110 used for securing components.

More illustrative information will now be set forth regarding various optional architectures and features with which the foregoing framework may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2A:
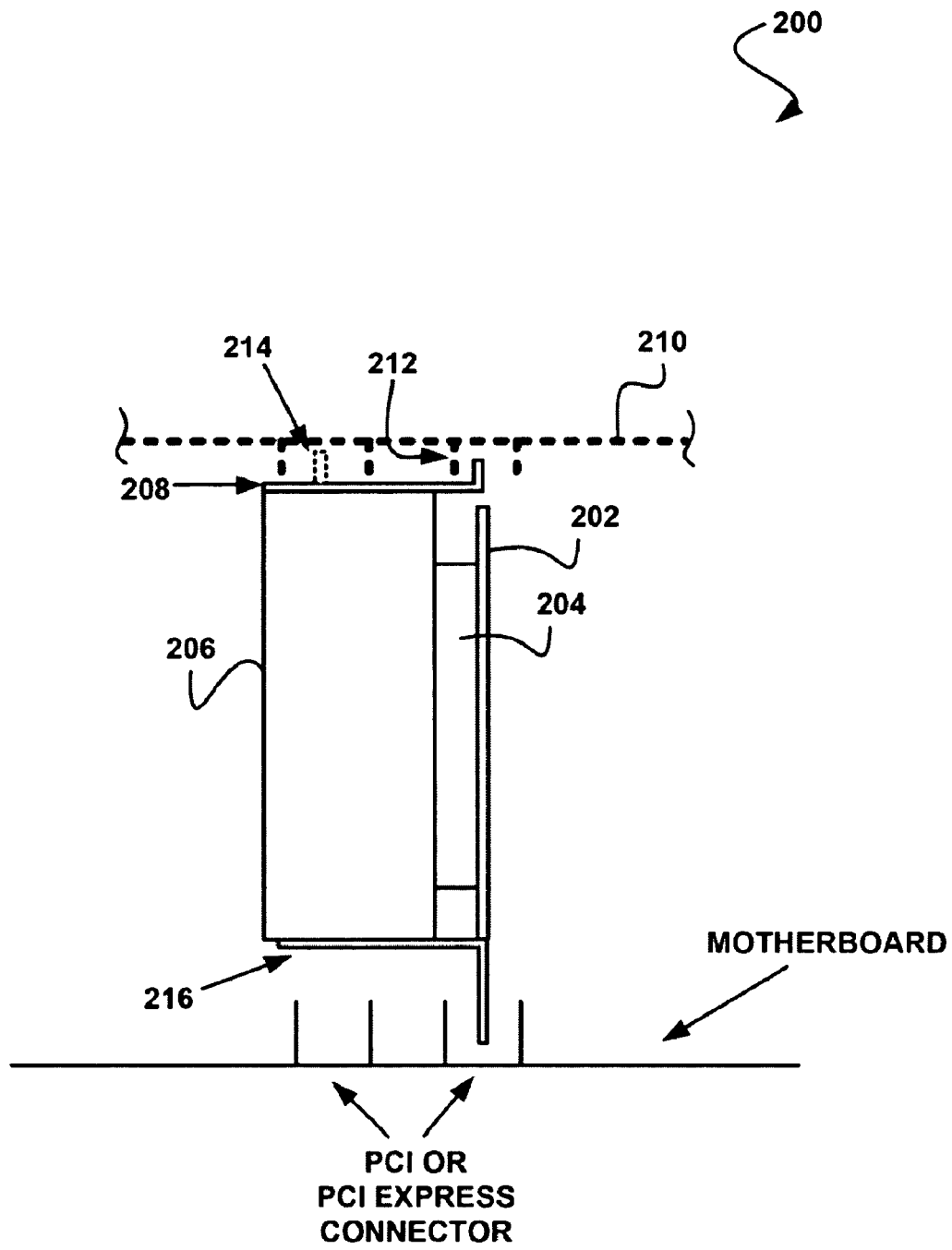
FIG. 2A shows an apparatus for providing a direct mechanical coupling with a chassis and a heat sink, in accordance with another embodiment.

FIG. 2A shows an apparatus 200 for providing a direct mechanical coupling with a chassis and a heat sink, in accordance with another embodiment. As an option, the present apparatus 200 may be implemented in the contest of the functionality and architecture of FIG. 1. Of course, however, the apparatus 200 may be implemented in any desired environment. It should also be noted that the aforementioned definitions may apply during the present description.

As shown, a circuit board 202 is provided with at least one processor 204 mounted thereon. Additionally, a heat sink 206 is provided. The heat sink 206 is mechanically coupled to at least one of the circuit board 202 and the processor 204 for providing thermal communication between the heat sink 206 and the circuit board 202. Further, a mount 208 is provided. In this case, the mount 208 is coupled to the heat sink 206 for providing a direct mechanical coupling with a chassis 210.

As shown further, a circuit board connector 212 is provided for holding down the circuit board 202. In this case, the circuit board connector 212 may be a component of the chassis 210. For example, the circuit board connector 212 may be provided by an original equipment manufacturer (OEM) of the chassis 210.

This circuit board connector 212 provided with the chassis 210 may be utilized to secure the heat sink 206 via the mount 210 and reduce or eliminate flexing of the circuit board 202, which may cause component or connection damage. For example, by mounting the heat sink 206 to the chassis 210, the chassis 210 may be utilized to absorb any stress introduced by forces caused by acceleration of the heat sink 206, as opposed to the stress being imposed on the circuit board 202.

In one embodiment, and as illustrated in FIG. 2A, the height of the circuit board 202 may be reduced such that the circuit board 202 does not engage with the circuit board connector 212. In this way, the heat sink 206 and the associated mount 208 may be the only component engaged by the circuit board connector 212. This mounting technique may be implemented for systems utilizing dual slot solutions as well as systems that have mounting options for every slot. For single slot solutions or systems where a mounting support is not provided for each slot, the mount 208 may be provided on the heat sink 206 in substantially the same plane as the circuit board 202.

It should be noted that, in various embodiments, the circuit board connector 212 may include one or more slots. For example, in one embodiment, the circuit board connector 212 may only include one slot for holding down a component (e.g. a PCB, a mount for a heat sink, etc.). In this case, the mount 208 may be configured for providing the direct mechanical coupling with the chassis 210 at a single point of contact.

In the case that the slot for the circuit board connector 212 is positioned in a plane of the circuit board 202, the circuit board 202 may be shortened such that the mount 208 may provide the point of contact with the chassis 210 via the slot for the circuit board connector 212. In another embodiment, the mount 208 may be configured for providing the direct mechanical coupling with the chassis 210 at a plurality of points of contact. For example, the mount 208 may include one or more additional features 214 (e.g. fins, pins, etc.) for providing contact with the chassis 210. In this way, the mount 208 may be configured for providing the direct mechanical coupling with any hold-down mechanism (e.g. the circuit board connector 212, etc.) of the chassis 210.

In one embodiment, and as shown in FIG. 2A, a mount 216 may be configured for providing the direct mechanical coupling with the chassis 210 opposite of the circuit board connector 212 of the chassis 210. In this case, the mount 216 may utilize PCI or PCI express connectors for the coupling with the chassis 210, via a motherboard. In various embodiments, the mount 216 may utilize one or more PCI connectors. It should be noted that the mount 216 may utilize the PCI connectors in addition to the circuit board 202 using the PCI connectors.

Of course, the mount 216 may be coupled to the chassis 210 in a variety of other ways (e.g. direct coupling, friction coupling, a chassis mechanism, etc.). For example, in one embodiment, the mount 216 may be coupled directly to the chassis 210 via a hole or slot in the motherboard. In either case, the mount 216 may be configured for providing the mechanical coupling (e.g. through a mother board, etc.) with the chassis 210 at a single point of contact or at multiple points of contact.

When using the mount 208 or the mount 216, the mounts may be configured to reside in a first plane that is separate from a second plane in which the circuit board 202 resides, or in both the first plane and in the second plane. Still yet, the mounts 208 and 216 may be configured to reside substantially in the second plane in which the circuit board 202 resides (e.g. offset minimally, etc.).

In any of these cases, the mounts 208 and 216 may be configured to inhibit mechanical stress to the circuit board 202. It should be noted that, in various embodiments, one or more mounts may be utilized. For example, in one embodiment, both the mounts 208 and 216 may be utilized. In another embodiment, one of the mounts 208 or 216 may be utilized.

Furthermore, the mounts 208 or 216 may be any number of shapes or combinations of shapes. For example, as shown in FIG. 2A, the mounts 208 or 216 may have a substantially L-shaped configuration. In another embodiment, the mounts 208 or 216 may have a substantially L-shaped configuration, a substantially rectangular configuration, and/or a substantially cylindrical configuration.

In these cases, the mounts 208 or 216 may also include additional features (e.g. fins, pins, etc.) for contacting multiple points of the chassis 210 and/or the circuit board connector 212 of the chassis 210. Still yet, the mounts 208 and 216 may be configured such that movement of the heat sink 206 along one or more dimensions is precluded. Thus, various configurations of the mounts associated with the heat sink may be implemented such that any flexing of the circuit board 202 including the processor 204 may be eliminated or substantially reduced. Furthermore, the flexing may be eliminated without adding components to the circuit board 202.

As mentioned above, in one embodiment, the motherboard may be configured such that a mount coupled to the heat sink 206 (e.g. the mount 216, etc.) may provide a direct mechanical coupling with the chassis. In this case, a slot or hole may be made in the motherboard such that a mount may extend through the motherboard to provide a direct mechanical coupling with the chassis. As an option, this mount may extend from the heat sink 206 through a first side of the motherboard, coupling to the chassis on a second side of the motherboard.

Figure 2B:
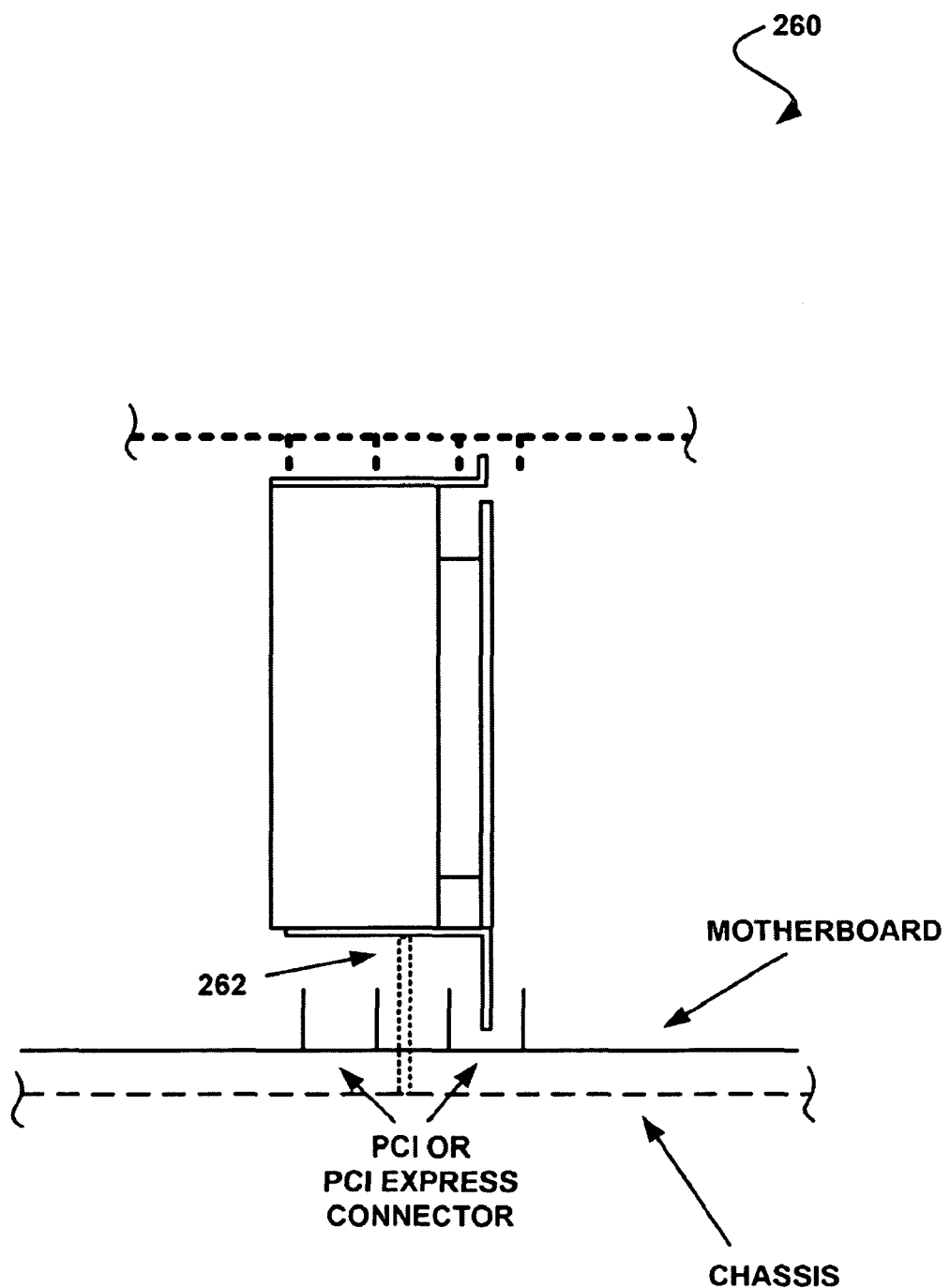
FIG. 2B shows an apparatus for providing a direct mechanical coupling with a chassis and a heat sink, in accordance with another embodiment.

FIG. 2B shows an apparatus 260 for providing a direct mechanical coupling with a chassis and a heat sink, in accordance with another embodiment. As an option, the present apparatus 260 may be implemented in the context of the functionality and architecture of FIGS. 1-2A. Of course, however, the apparatus 260 may be implemented in any desired environment. Additionally, the aforementioned definitions may apply during the present description.

As shown, a mount 262 may be provided on a lower end of a card. In this case, the mount 262 may engage with a motherboard and/or chassis directly. In various embodiments, this mount 262 may be used in addition to, or instead of an L-shaped mount capable of being coupled to a PCI or PCI express connector.

Figure 3:
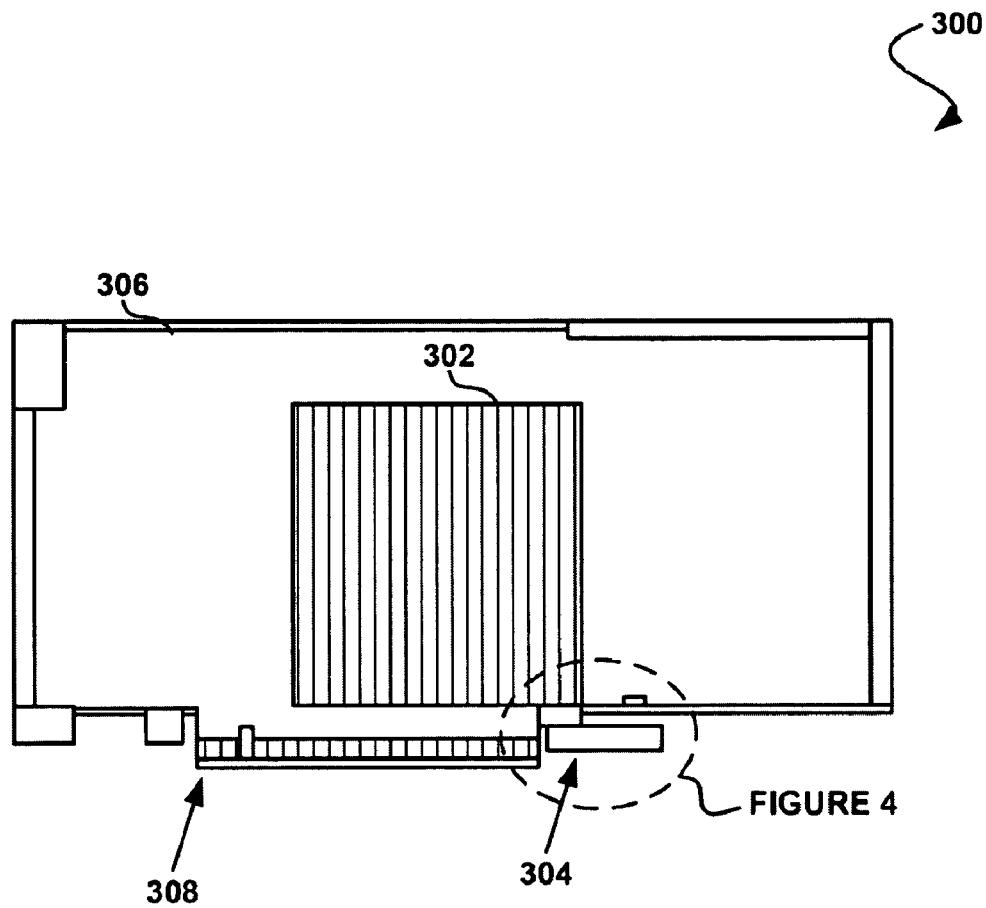
FIG. 3 shows an apparatus for providing a direct mechanical coupling with a chassis and a heat sink, in accordance with another embodiment.

FIG. 3 shows an apparatus 300 for providing a direct mechanical coupling with a chassis and a heat sink, in accordance with one embodiment. As an option, the present apparatus 300 may be implemented in the context of the functionality and architecture of FIGS. 1-2B. Of course, however, the apparatus 300 may be implemented in any desired environment. Again, the aforementioned definitions may apply during the present description.

As shown, the apparatus 300 includes a mount 304 coupled to a heat sink 302 for providing a direct mechanical coupling with a chassis (not shown). In this case, the mount 304 has a substantially L-shaped configuration. Furthermore, the mount 304 may be utilized to provide support by coupling to a PCI or PCI express connector of a motherboard (not shown).

In this way, the mount 304 may inhibit mechanical stress to a circuit board 306 to which the heat sink 302 is coupled. Furthermore, the mount 304 may be inserted into a PCI connector of the motherboard in addition to a PCI connector 308 of the circuit board 306 being inserted into the PCI connector of the motherboard for communication between the circuit board 306 and the motherboard.

The mount 304 may be integrally coupled to the heat sink 302. For example, the mount 304 may be coupled to the heat sink 302 during a casting process. In another embodiment, the mount 304 may be coupled to the heat sink 302 during a fabrication process.

Figure 4:
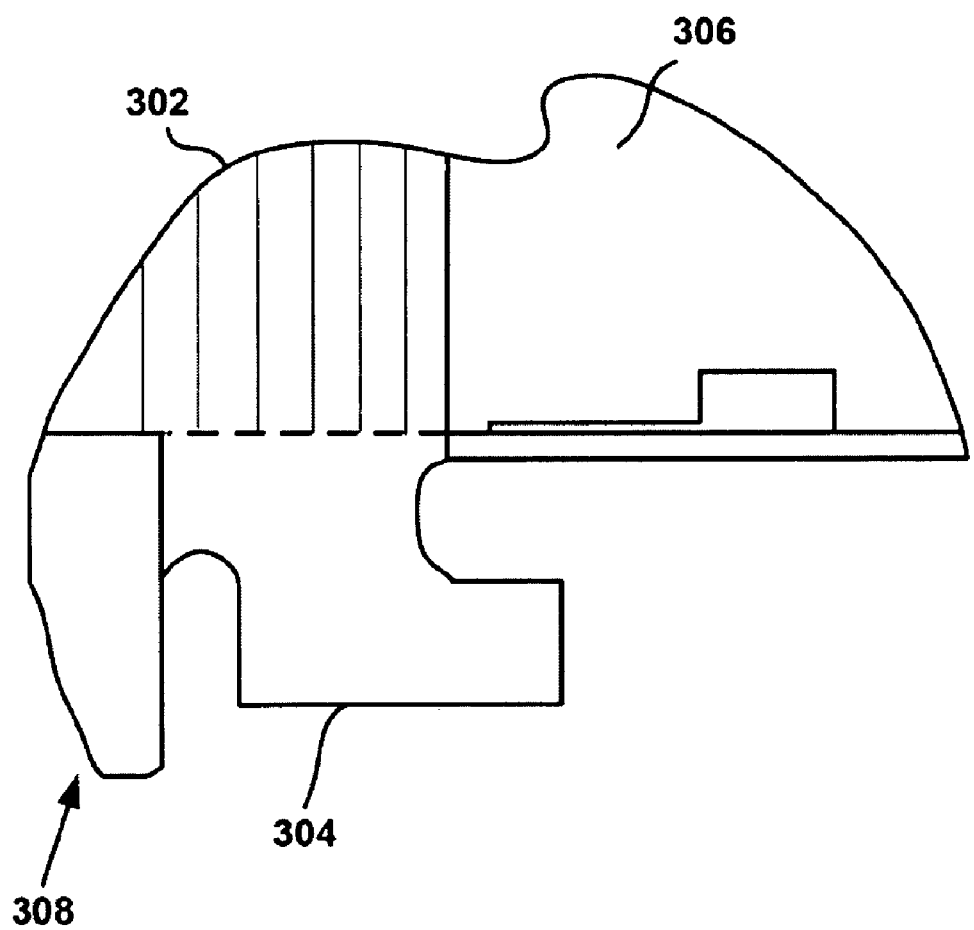
FIG. 4 shows a mount of the apparatus of FIG. 3, in accordance with one embodiment.

It should be noted that the heat sink 302 and the mount 304 may be made out of the same or different material. For example, in one embodiment, the heat sink 302 and the mount 304 may both be made out of a thermally conductive material (e.g. aluminum, etc.). In another embodiment, the heat sink 302 may be made out of thermally conductive material and the mount 304 may be made out of a non-conductive material or a material less thermally conductive than the heat sink 302. FIG. 4 shows the mount 304 of the apparatus 300 of FIG. 3, in accordance with another embodiment.

Figure 5:
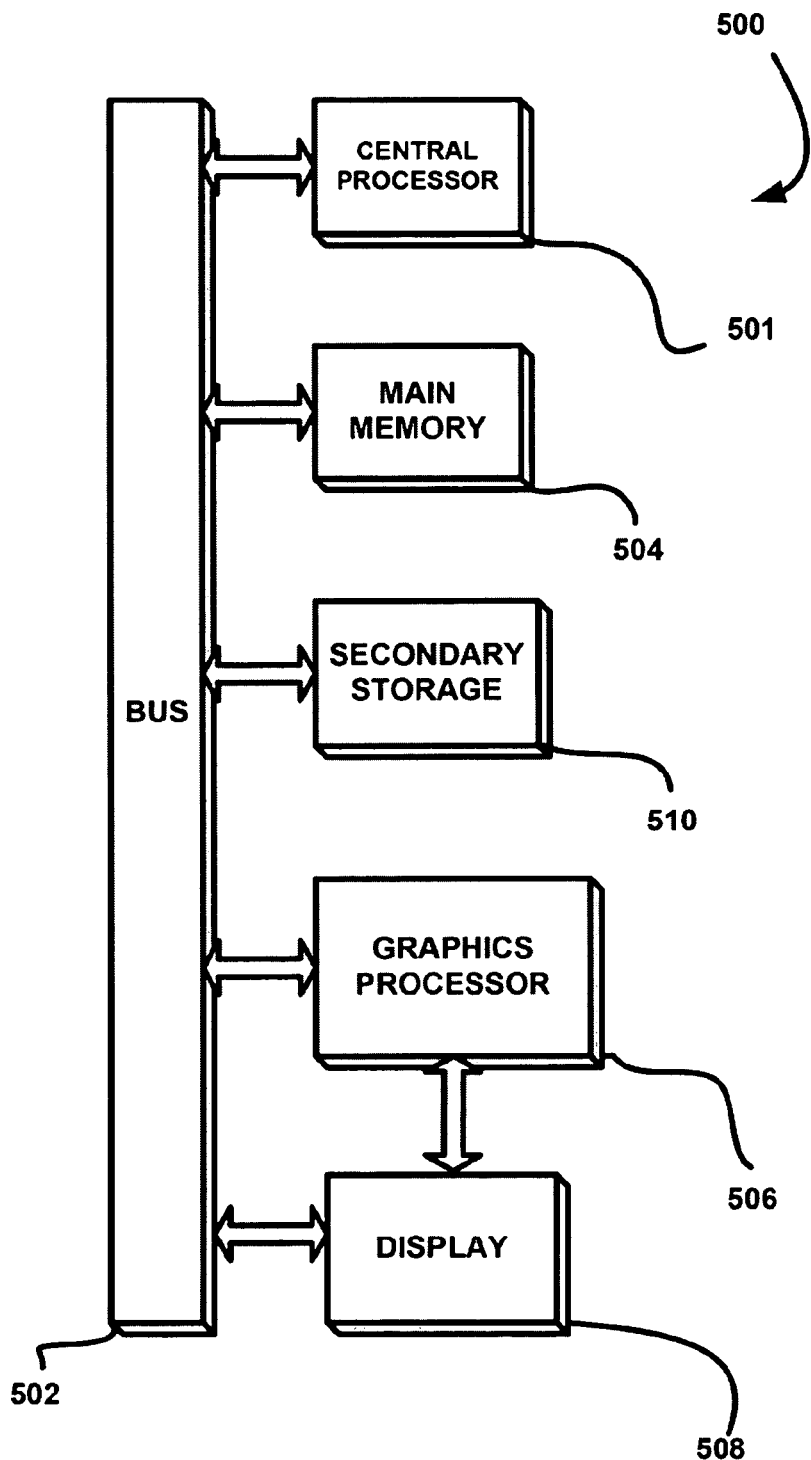
FIG. 5 illustrates an exemplary system in which the various architecture and/or functionality of the various previous embodiments may be implemented.

FIG. 5 illustrates an exemplary system 500 in which the various architecture and/or functionality of the various previous embodiments may be implemented. As shown, a system 500 is provided including at least one host processor 501 which is connected to a communication bus 502. The system 500 also includes a main memory 504. Control logic (software) and data are stored in the main memory 504 which may take the form of random access memory (RAM).

The system 500 also includes a graphics processor 506 and a display 508, i.e. a computer monitor. In one embodiment, the graphics processor 506 may include a plurality of shader modules, a rasterization module, etc. Each of the foregoing modules may even be situated on a single semiconductor platform to form a graphics processing unit (GPU).

In the present description, a single semiconductor platform may refer to a sole unitary semiconductor-based integrated circuit or chip. It should be noted that the term single semiconductor platform may also refer to multi-chip modules with increased connectivity which simulate on-chip operation, and make substantial improvements over utilizing a conventional central processing unit (CPU) and bus implementation. Of course, the various modules may also be situated separately or in various combinations of semiconductor platforms per the desires of the user.

The system 500 may also include a secondary storage 510. The secondary storage 510 includes, for example, a hard disk drive and/or a removable storage drive, representing a floppy disk drive, a magnetic tape drive, a compact disk drive, etc. The removable storage drive reads from and/or writes to a removable storage unit in a well known manner.

Computer programs, or computer control logic algorithms, may be stored in the main memory 504 and/or the secondary storage 510. Such computer programs, when executed, enable the system 500 to perform various functions. Memory 504, storage 510 and/or any other storage are possible examples of computer-readable media.

In one embodiment, the architecture and/or functionality of the various previous figures may be implemented in the context of the host processor 501, graphics processor 506, an integrated circuit (not shown) that is capable of at least a portion of the capabilities of both the host processor 501 and the graphics processor 506, a chipset (i.e. a group of integrated circuits designed to work and sold as a unit for performing related functions, etc.), and/or any other integrated circuit for that matter.

Still yet, the architecture and/or functionality of the various previous figures may be implemented in the context of a general computer system, a circuit board system, a game console system dedicated for entertainment purposes, an application-specific system, and/or any other desired system. For example, the system 500 may take the form of a desktop computer, lap-top computer, and/or any other type of logic. Still yet, the system 500 may take the form of various other devices including, but not limited to, a personal digital assistant (PDA) device, a mobile phone device, a television, etc.

Further, while not shown, the system 500 may be coupled to a network [e.g. a telecommunications network, local area network (LAN), wireless network, wide area network (WAN) such as the Internet, peer-to-peer network, cable network, etc.) for communication purposes.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. An apparatus, comprising:
a circuit board with at least one processor mounted thereon, the circuit board having a circuit board connector along an edge of the circuit board for insertion into a circuit board slot of a motherboard for communication therebetween;
a heat sink mechanically coupled to at least one of the circuit board and the processor for providing thermal communication between the heat sink and the circuit board, the heat sink comprising a primary surface that interfaces with the at least one of the circuit board and the processor, and four walls formed orthogonally to and extending from the primary surface of the heat sink, a first one of the four walls being closest to the circuit board connector along the edge of the circuit board for orientation of the first wall parallel to the motherboard, a second one of the four walls opposite of the first wall relative to the primary surface of the heat sink and oriented parallel to the first wall, and third and fourth walls each perpendicular to and connecting the first wall and the second wall; and
a mount coupled to the second wall of the heat sink for providing a direct mechanical coupling into a slot of a chassis, at least a portion of the mount extending from the second wall of the heat sink in a direction parallel to the circuit board connector of the circuit board for insertion of the mount into the slot of the chassis;
wherein a second mount is coupled to the first wall of the heat sink for providing a second direct mechanical coupling into a second slot of the chassis, at least a portion of the second mount extending from the first wall of the heat sink in a direction parallel to the mount coupled to the second wall of the heat sink and parallel to the circuit board connector of the circuit board, for insertion of the second mount into the second slot of the chassis.

2. The apparatus of claim 1, wherein the processor includes a graphics processor.

3. The apparatus of claim 1, wherein the mount is integrally coupled to the second wall of the heat sink.

4. The apparatus of claim 1, wherein the mount is screwably coupled to the second wall of the heat sink.

5. The apparatus of claim 1, wherein the mount, when providing the direct mechanical coupling, precludes movement along at least one dimension.

6. The apparatus of claim 1, wherein the mount is substantially rectilinear.

7. The apparatus of claim 1, wherein the mount, when providing the direct mechanical coupling, precludes movement along at least two dimensions.

8. The apparatus of claim 1, wherein the mount is substantially cylindrical.

9. The apparatus of claim 1, wherein the mount is configured for providing the direct mechanical coupling with the chassis at a single point of contact.

10. The apparatus of claim 1, wherein the mount is configured for providing the direct mechanical coupling with the chassis at a plurality of points of contact.

11. The apparatus of claim 1, wherein the mount is configured for providing the direct mechanical coupling with the chassis utilizing another circuit board connector of the chassis.

12. The apparatus of claim 1, wherein a first portion of the mount resides in another plane that is separate and opposite from the plane in which the circuit board resides and a second portion of the mount substantially resides in the plane in which the circuit board resides.

13. The apparatus of claim 12, wherein the first portion of the mount that resides in the other plane is directly mechanically coupled with the chassis via a plurality of direct mechanical couplings of the chassis residing in the other plane.

14. The apparatus of claim 1, wherein the mount inhibits mechanical stress to the circuit board.

15. The apparatus of claim 1, wherein the mount has a substantially L-shaped configuration.

16. The apparatus of claim 1, wherein the first mount and second mount substantially reside in a plane that is the same as a plane in which the circuit board resides.

17. The apparatus of claim 16, wherein the mount and the second mount both have a substantially L-shaped configuration, such that both the mount and the second mount each have a first portion and a second portion, where the first portion of the mount is coupled along the second wall of the heat sink and the first portion of the second mount is coupled along the first wall of the heat sink, and the second portion of each of the mount and second mount extend from the corresponding first portion such that both of the second portions extends parallel to the circuit board connector.

18. The apparatus of claim 17, wherein the second portion of the second mount is in the plane of the circuit board connector such that the second mount is also inserted into the circuit board slot of the motherboard along with the circuit board connector of the circuit board.

19. A method, comprising;
mechanically coupling a heat sink to at least one of a circuit board and a processor for providing thermal communication between the heat sink and the circuit board, the circuit board having a circuit board connector along an edge of the circuit board for insertion into a circuit board slot of a motherboard for communication therebetween, and the heat sink comprising a primary surface that interfaces with the at least one of the circuit board and the processor, and four walls formed orthogonally to and extending from the primary surface of the heat sink, the heat sink oriented such that:
a first one of the four walls is closest to the circuit board connector along the edge of the circuit board for orientation of the first wall parallel to the motherboard,
a second one of the four walls is opposite of the first wall relative to the primary surface of the heat sink and oriented parallel to the first wall, and
third and fourth walls are each perpendicular to, and connect, the first wall and the second wall; and
coupling a mount to the second wall of the heat sink for providing a direct mechanical coupling with a slot of a chassis, at least a portion of the mount extending from the second wall of the heat sink in a direction parallel to the circuit board connector of the circuit board for insertion of the mount into the slot of the chassis;
wherein a second mount is coupled to the first wall of the heat sink for providing a second direct mechanical coupling into a second slot of the chassis, at least a portion of the second mount extending from the first wall of the heat sink in a direction parallel to the mount coupled to the second wall of the heat sink and parallel to the circuit board connector of the circuit board, for insertion of the second mount into the second slot of the chassis.

20. A system, comprising:
a chassis configured to include:
a circuit board with at least one processor mounted thereon, the circuit board having a circuit board connector along an edge of the circuit board for insertion into a circuit board slot of a motherboard for communication therebetween;
a heat sink mechanically coupled to at least one of the circuit board and the processor for providing thermal communication between the heat sink and the circuit board, the heat sink comprising a primary surface that interfaces with the at least one of the circuit board and the processor, and four walls formed orthogonally to and extending from the primary surface of the heat sink, a first one of the four walls being closest to the circuit board connector along the edge of the circuit board for orientation of the first wall parallel to the motherboard, a second one of the four walls opposite of the first wall relative to the primary surface of the heat sink and oriented parallel to the first wall, and third and fourth walls each perpendicular to and connecting the first wall and the second wall; and
a mount coupled to the second wall of the heat sink for providing a direct mechanical coupling into a slot of the chassis, at least a portion of the mount extending from the second wall of the heat sink in a direction parallel to the circuit board connector of the circuit board for insertion of the mount into the slot of the chassis;
wherein a second mount is coupled to the first wall of the heat sink for providing a second direct mechanical coupling into a second slot of the chassis, at least a portion of the second mount extending from the first wall of the heat sink in a direction parallel to the mount coupled to the second wall of the heat sink and parallel to the circuit board connector of the circuit board, for insertion of the second mount into the second slot of the chassis.

21. The system of claim 20, wherein the processor remains in communication with memory and a display via a bus.

* * * * *